United States Patent [19]

Rengstl

[11] Patent Number: 4,873,297
[45] Date of Patent: Oct. 10, 1989

[54] PROCESS FOR REDUCING THE HALOGEN CONTENT OF HALOGEN-CONTAINING POLYCARBOSILANES AND POLYSILANES

[75] Inventor: Alfred Rengstl, Reischach, Fed. Rep. of Germany

[73] Assignee: Wacker-Chemie GmbH, Munich, Fed. Rep. of Germany

[21] Appl. No.: 205,874

[22] Filed: Jun. 13, 1988

[30] Foreign Application Priority Data

Aug. 11, 1987 [DE] Fed. Rep. of Germany ....... 3726702

[51] Int. Cl.⁴ ............................................. C08F 283/00
[52] U.S. Cl. ...................................... 525/474; 501/88; 501/92; 501/97
[58] Field of Search ............................ 501/88, 92, 97; 525/474

[56] References Cited

U.S. PATENT DOCUMENTS 4,650,837 3/1987 Seyferth et al. .................... 525/474
4,709,054 11/1987 Rich ..................................... 556/436

Primary Examiner—Melvyn I. Marquis

[57] ABSTRACT

The invention relates to a process for reducing the halogen content of polysilanes and/or polycarbosilanes having halogen bonded directly to silicon atoms in which the halogen-containing polysilanes and/or polycarbosilanes are contacted with compounds of the general formula

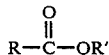

where R represents hydrogen or an alkyl radical having 1 or 2 carbon atoms and R' represents hydrogen, an alkali metal or an acetyl radical.

6 Claims, No Drawings

PROCESS FOR REDUCING THE HALOGEN CONTENT OF HALOGEN-CONTAINING POLYCARBOSILANES AND POLYSILANES

The present invention relates to a process for treating halogen-containing polysilanes and polycarbosilanes and more particularly to a process for reducing the halogen content of polysilanes and polycarbosilanes having a halogen atom bonded to the silicon atoms.

Polysilanes and polycarbosilanes are valuable intermediates in the preparation of silicon carbide. Polysilanes, for example, can be prepared from organochlorodisilanes in the presence of tetraalkylphosphonium halides or tetraalkylammonium halides (U.S. Pat. No. 4,298,558 to Baney et al and British Pat. No. 2,024,789). The polymers obtained from these processes have considerable amounts of chlorine bonded to silicon atoms. In order to prevent the liberation of halogen-containing gases during further processing of the polymers into silicon carbide, the halogen content must be reduced. R. H. Baney et al [Organometallics 1983 (2), 859–864] describes a process for preparing polycarbosilanes and polysilanes by reacting halogen-containing polycarbosilanes and polysilanes with Grignard reagents, alcohols, lithium alanate or with primary amines.

It is an object of the present invention to provide a process for reducing the halogen content of halogen-containing polysilanes and polycarbosilanes. Another object of the invention is to provide a process for reducing the halogen content of halogen-containing polysilanes and polycarbosilanes which involves using simple equipment and an inexpensive reagent which can be handled without any unnecessary safety precautions. A further object of this invention is to provide a process for reducing the halogen content of halogen-containing polysilanes and polycarbosilanes in which the undesirable products and excess reagent can be easily removed after the reaction is complete.

SUMMARY OF THE INVENTION

The foregoing objects and others which will become apparent from the following description are accomplished in accordance with this invention, generally speaking, by providing a process for reducing the halogen content of halogen-containing polysilanes and polycarbosilanes which comprises contacting the halogen-containing polysilanes and/or polycarbosilanes with compounds having the formula

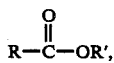

where R is hydrogen or an alkyl radical having 1 or 2 carbon atoms and R' is hydrogen, an alkali metal or an acetyl radical.

Description of the Invention

In the process of this invention, the halogen-containing polysilanes and/or polycarbosilanes are reacted with compounds of the formula

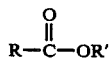

where R and R' are the same as above at temperatures of from about 20° to about 300° C.

In the above formula, R is an alkyl radical having 1 or 2 carbon atoms such as the methyl and ethyl radicals and R' is hydrogen, an alkali metal such as lithium, potassium and sodium or an acetyl radical.

Compounds which are preferably employed in this invention are formic acid, acetic acid, propionic acid, lithium acetate, sodium acetate, potassium acetate, acetic anhydride and propionic anhydride.

Polysilanes having halogen bonded directly to silicon atoms are described, for example, in U.S. Pat. No. 4,298,558 to Baney et al and British Pat. No. 2,024,789. They contain units of the formula

where $R^1$ represents the same or different halogen and/or hydrocarbon radicals having from 1 to 18 carbon atoms, preferably the chlorine atom and/or the methyl radical and n represents an integer having a value of 0, 1, 2 or 3, in which the units are bonded to one another via Si-Si bonds.

Polycarbosilanes having halogen bonded directly to silicon atoms are likewise known and their preparation is described, for example, in W. Noll, Chemistry and Technology of Silicones, Academic Press, Orlando, 1968, pages 356–364. They contain units of the formula

where $R^1$ and n are the same as above, and $R^2$ represents divalent hydrocarbon radicals having from 1 to 18 carbon atoms, preferably phenylene radicals and radicals of the formula $-(CH_2)_m-$, where m is an integer of from 1 to 8.

Polycarbosilanes of this type are available, inter alia, by reacting dimethyl dichlorosilane with 1,6-dichlorohexane (W. Noll, Chemistry and Technology of Silicones, Academic Press, Orlando, 1968, page 357).

The process of this invention can, of course, be applied to all polymers which have a halogen atom bonded directly to a silicon atom. Such polymers can also be prepared, for example, by pyrolysis of alkylchlorosilanes at 400° to 700° C., or by passing $HSiCl_3$, $SiCl_4$ or $Si_2Cl_6$ over silicon heated from 1,000° to 1,300° C.

By the term "polysilanes and/or polycarbosilanes", we mean to include polymers which carry both units of formula (I) and units of formula (II) in the same molecule. Likewise, mixtures of polysilanes, mixtures of polycarbosilanes and mixtures of at least one polysilane and at least one polycarbosilane are also included in this term.

It is believed that the process of this invention is based on the following reaction:

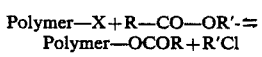

in which X represents a halogen atom, preferably a chlorine atom, bonded directly to a silicon atom.

The process of this invention is preferably carried out at temperatures of from 20° C. to 300° C., and more preferably from 50° C. to 200° C.

The process of this invention can be carried out at the pressure of the surrounding atmosphere, i.e., at 0.102 mPa (abs.), or at about 0.102 mPa (abs.), but it can also be carried out at elevated or reduced pressures. Pressures of from 0.01 mPa to 2 mPa (abs.) are preferred.

The reaction time is preferably from 0.1 hour to 10 hours, and more preferably from 1 hour to 5 hours.

The process of this invention can be carried out in the presence of an inert solvent. Examples of such solvents are aromatics and substituted aromatics, such as benzene and toluene; aliphatic hydrocarbons and mixtures thereof, such as n-octane, n-decane, mixtures of octane isomers, petroleum ethers having various boiling ranges, and other similar solvents. Primary, secondary and tertiary amines, such as, for example, n-butylamine, triethylamine, pyridine, picoline, are also suitable as an additive or as the solvent.

It is also possible for the reagents of the general formula R—CO—OR', where R and R' are the same as above to act as the solvent or suspending medium so that no additional solvent is necessary. Accordingly, it may be preferred to employ the reagents mentioned in excess rather than that based on the equivalent amount of chlorine to be removed.

If primary, secondary or tertiary amines or heterocyclic compounds are used as an additive, then from 0.1 to 10 mol percent, based on the total number of mols of the chlorine bonded to the chlorine-containing polysilane and/or polycarbosilane, are preferably employed, and more preferably from about 0.5 to 2 mol percent may be employed.

The polysilanes and/or polycarbosilanes which can be prepared according to this invention are used in preparing SiC, such as SiC-containing ceramic materials, as SiC-containing fibers or SiC-containing ceramic-protective coatings. Processes for preparing SiC materials are described by R. West in Journal of Organometallic Chemistry 300, 327–346 (1986). The polysilane and/or polycarbosilane obtained according to this invention is pyrolized in an inert atmosphere or in vacuo at temperatures of 700° to 1,300° C.

Furthermore, the polysilanes and/or polycarbosilanes which can be prepared according to this invention are used as binders during sintering of, for example, SiC, $Si_3N_4$, $B_4C$, BN, TiC and TiN.

The examples below were carried out at a pressure of 0.10 mPa (abs.) and at a temperature of 20° C., unless otherwise specified. The percentages relate to the weight of the particular polysilane or polycarbosilane.

EXAMPLE 1

About 13.75 g of a polysilane containing 35 percent by weight of Si-bonded chlorine and whose organic groups are methyl groups are dissolved in 70 ml of xylene and then 28.03 g (0.27 mol) of acetic anhydride were added dropwise with stirring. The mixture was refluxed for 1 hour, and then the excess acetic anhydride, the acetyl chloride that was formed and the solvent were subsequently removed by distillation. A vacuum was applied at a temperature of from 150° to 200° C. After cooling, 16.61 g of a solid, yellow polymer which melted at 115° C., were obtained. The yellow polymer was soluble in toluene, tetrahydrofuran, $CH_2Cl_2$, $CCl_4$ and $CHCl_3$, and had a chlorine content of 2.7 percent and a mean molecular weight of 80,000 g/mol.

EXAMPLE 2

About 6.86 g of the polysilane employed in Example 1 were dissolved in 35 ml of xylene, and then 8.1 g (0.135 mol) of acetic acid were added dropwise. The mixture was refluxed until the evolution of hydrogen chloride was complete, and was subsequently volatitized off. After cooling 7.2 g of a solid, pale yellow polymer, which melted at 100° C. and had a chlorine content of 4.1 percent, were obtained.

EXAMPLE 3

The reaction was carried out in accordance with Example 2, except that when the evolution of hydrogen chloride was complete, then 11.65 ml of pyridine were added. This mixture was boiled briefly, then 50 ml of xylene were added, and the cloudy solution was filtered, and the filtrate evaporated. A vacuum was applied at 155° C. About 7.1 g of a solid, yellow polymer, which was soluble in organic solvents, had a melting point of 95° C. and a chlorine content of 0.8 percent, were obtained.

EXAMPLE 4

The polymers of Examples 1 and 2 were pyrolized at 1,100° C. in an argon atmosphere to give SiC. The following yields of SiC were obtained:
Example 1: 73.9 percent.
Example 2: 79.6 percent.
Example 3: 57.1 percent.

What is claimed is:

1. A process for reducing the halogen content of a polycarbosilane and/or a polysilane having halogen bonded directly to silicon atoms, which comprises contacting a halogen-containing polysilane and/or polycarbosilane with a compound of the formula

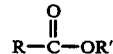

where R is selected from the group consisting of hydrogen and an alkyl radical having 1 or 2 carbon atoms and R' is selected from the group consisting of hydrogen, an alkali metal and an acetyl radical.

2. The process of claim 1, wherein the alkyl radical having 1 or 2 carbon atoms is selected from the group consisting of a methyl and ethyl radical.

3. The process of claim 1, wherein the alkali metal is selected from the group consisting of lithium, potassium and sodium.

4. The process of claim 1, which is carried out at a temperature of from 20° C. to 300° C.

5. A process for preparing SiC-containing ceramic material which comprises pyrolyzing the polysilane and/or polycarbosilane obtained from the process of claim 1.

6. A process for preparing binders which comprises sintering the polysilane and/or polycarbosilane obtained from the process of claim 1 with a material selected from the group consisting of silicon carbide, silicon nitride, boron carbide, boron nitride, titanium carbide and titanium nitride.

* * * * *